US006634013B2

(12) United States Patent
Shinzawa (10) Patent No.: US 6,634,013 B2
(45) Date of Patent: Oct. 14, 2003

(54) WIRING FAILURE ANALYSIS METHOD USING SIMULATION OF ELECTROMIGRATION

(75) Inventor: Tsutomu Shinzawa, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 196 days.

(21) Appl. No.: 09/872,533

(22) Filed: Jun. 1, 2001

(65) Prior Publication Data

US 2002/0107675 A1 Aug. 8, 2002

(30) Foreign Application Priority Data

Jun. 5, 2000 (JP) ........................................ 2000-166890

(51) Int. Cl.$^7$ ...................... G06F 17/50; H01L 21/4763; H01L 21/44
(52) U.S. Cl. ................................ 716/5; 716/1; 438/675; 438/623; 438/622; 438/625
(58) Field of Search ................................ 716/5, 1–4, 6; 438/627, 675, 622, 625, 14; 430/622

(56) References Cited

U.S. PATENT DOCUMENTS

| 5,300,307 | A | * | 4/1994 | Frear et al. ................... 427/96 |
| 5,930,587 | A | * | 7/1999 | Ryan ........................... 438/14 |
| 6,197,685 | B1 | * | 3/2001 | Domae et al. ............... 438/648 |
| 6,245,675 | B1 | * | 6/2001 | Liang et al. ................. 438/675 |
| 6,349,401 | B2 | * | 2/2002 | Tamaki ........................... 716/2 |
| 6,365,503 | B1 | * | 4/2002 | Huang et al. ................ 438/623 |

FOREIGN PATENT DOCUMENTS

| JP | 6-314691 | | 11/1994 | |
| JP | 7-283283 | | 10/1995 | |
| JP | 07-283283 | * | 10/1995 | ........... H01L/21/66 |
| JP | 3017131 | | 12/1999 | |

OTHER PUBLICATIONS

Wu, W et al "Electromigration Performance for Al/SiO2, Cu/SiO2, and Cu /Low–K Interconnect System, including Joule Heating Effect", 2000 IEEE International Integrated Reliability Workshop, Oct. 23–26, 2000, pp 165–166.*

(List continued on next page.)

Primary Examiner—Matthew Smith
Assistant Examiner—Magid Y Dimyan
(74) Attorney, Agent, or Firm—Choate, Hall & Stewart (57) ABSTRACT

The present invention provides a wiring failure analysis method that overcomes difficulties due to shape changes of wires in LSI circuits and the like by effecting current and heat transfer analysis as well as analysis of diffusion of atoms in crystal grain structures. Particularly, the wiring failure analysis method is designed to apply void shape analysis on reservoir portions of aluminum alloy wires coupled with tungsten (W) plugs. First, a structure of a wire to be simulated is created to solve its background field (temperature and current densities) in accordance with the finite element method. Then, diffusion analysis is performed using electron wind power, which is proportional to the current densities, and diffusion coefficients regarding parameters of the crystal grain structure such as the crystal lattice, grain boundary, interface and surface, on which vacancy concentrations are calculated. As for the grain boundary and interface, virtual voids are generated in proximity to prescribed nodes at which the vacancy concentrations exceeds the critical value. Differences of chemical potentials are calculated before and after generation of the virtual voids with respect to the prescribed nodes respectively. Then, one of the prescribed nodes is detected as a node that causes smallest variation of the chemical potentials due to generation of the virtual void. Thus, a void is generated in proximity to the detected node, which is then subjected to void shape deformation process using electromigration.

13 Claims, 9 Drawing Sheets

OTHER PUBLICATIONS

Grass, C.D. et al "Electromigration Reliability Improvement of W—Plug Vias by Titanium Layering", 32 nd IEEE International Reliability Physics Symposium, Apr. 11–14, 1994, pp 173–177.*

Fujii, M. et al., "Reservoir Length Dependence Of EM Lifetime For Tungsten Via Chains Under Low Current Stress", VMIC Conference, Jun. 18–20, 1996.

Kirchheim, R. et al., "Atomistic and Computer Modeling of Metallization Failure Of Integrated Circuits By Electromigration", *J. Appl. Phys.* 70(1), pp. 172–181, Jul. 1, 1991.

Artz, E. et al., "Electromigration Failure By Shape Change of Voids In Bamboo Lines", *J. Appl. Phys.* 76(3), pp. 1563–1571, Aug. 1, 1994.

* cited by examiner

WIRING FAILURE ANALYSIS METHOD USING SIMULATION OF ELECTROMIGRATION

BACKGROUND OF THE INVENTION

1. Field of the Invention

This invention generally relates to wiring failure analysis methods using simulation of electromigration that analyze wiring failures causing shape variations of wires by effecting current and heat transfer analysis and analysis of diffusion of atoms in crystal grain structures. Specifically, this invention relates to void shape analysis methods that analyze shapes of voids growing in areas that are smallest in variations of chemical potentials due to generation or development of voids per unit volume when vacancy concentrations exceed critical values.

2. Description of the Related Art

Japanese Patent Unexamined Publication No. Hei 7-283283 discloses an example of the conventional wiring failure analysis method that effects numerical analysis for wiring failures based on electromigration (EM) by combination of potential analysis and analysis of diffusion of grain boundaries. This method is designed to realize more precise analysis by reproducing phenomena which are very close to the actual phenomena. Operations and steps of this method will be described below.

(Step 1) To create crystal grain structures in accordance with shapes of wires.

(Step 2) To obtain current density distribution based on the finite element method.

(Step 3) To obtain temperature distribution based on the finite element method by using a heat source of Joule heat, which is generated in response to currents caused by using common meshes.

(Step 4) To calculate diffusion values of atoms on a network of grain boundaries being formed.

(Step 5) To perform prescribed processes based on assumption that voids and hillocks are generated when excess or deficiency is caused in balance of atoms at triple points respectively.

(Step 6) To repeat the aforementioned steps 1 to 5 until disconnection occurs in wiring due to growth of the voids or until it is regarded that fusion or melting occur in wiring when a part of the wiring is increased in temperature to reach the melting point.

Figure 7:
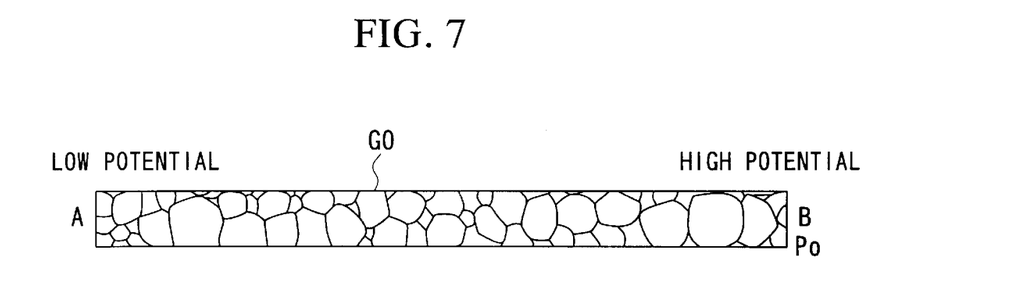
FIG. 7 is an enlarged view of a cross section of a wire that is formed by the conventional method.
Figure 8:
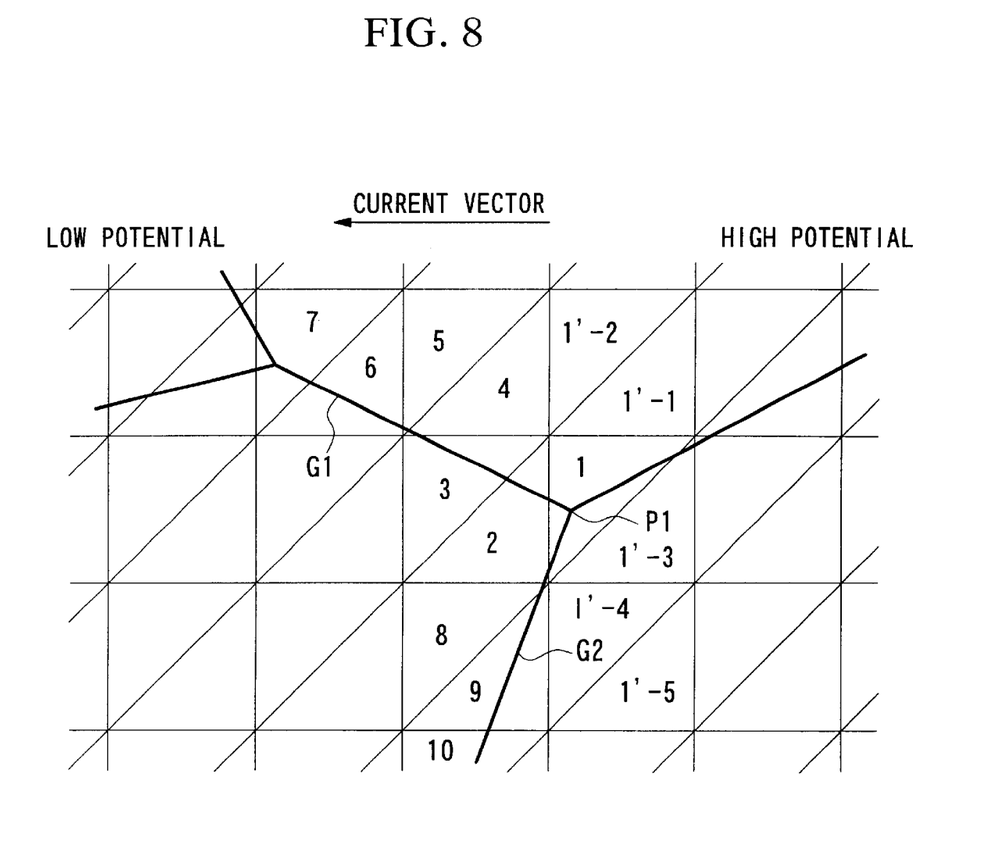
FIG. 8 diagrammatically shows an example of a network of grain boundaries being magnified.

FIG. 7 shows a cross section of a wire being magnified, which is formed by the conventional method. FIG. 8 shows a part of grain boundaries being magnified, which are formed inside of the wire. In the network of grain boundaries shown in FIG. 8, three grain boundaries cross with each other at a triple point (P1) or the like. It is well known that voids are easily generated at such a triple point.

As for failure determination, the conventional method uses increases of resistance at areas corresponding to the triple points and the like in which divergence occurs on atom fluxes.

It is noted again that the conventional wiring failure analysis method makes failure determination by detecting increases of resistance at the prescribed areas such as the triple points in which divergence occurs on atom fluxes. For this reason, the conventional method is inapplicable to reservoir portions of aluminum alloy wiring coupled with tungsten (W) plugs.

Due to development of fine structures for large scale integrated circuits (or LSI circuits), tungsten plugs are frequently used to cope with increases of aspect ratios of contact holes. If the tungsten is used for the aluminum wiring, aluminum atoms cannot be transmitted through the plugs, which in turn act as current paths. Although electric currents flow through the plugs, the aluminum atoms are stopped by the plugs. So, there is a problem in which electromigration defects are caused to occur at the plugs, which correspond to divergence points for the electromigration. A monograph entitled "Reservoir length dependence of EM lifetime for tungsten via chains under low current stress", which is written by M. Fujii, K. Koyama and J. Aoyama for VMIC Conference 312 (1996), proposes a solution to the aforementioned problem. That is, wires are extended in a direction opposite to the direction of currents to provide reservoir portions, by which supply sources of aluminum atoms are located to expand the lifetime of wires.

Because, atom drift due to the electromigration is extremely small at end portions of the reservoir portions that have low current densities. Therefore, it is possible to presume that divergence of atom fluxes are hardly caused to occur due to the atom drift that is one cause in occurrence of divergence of atom fluxes.

Originally, areas having high vacancy concentrations emerge just above the plugs, while the reservoir portions have low vacancy concentrations. Due to the gradient of concentrations that is another cause in occurrence of divergence of atom fluxes, vacancies are diffused so that the reservoir portions are increased in vacancy concentration. However, atom fluxes are caused to occur in the direction for actualizing uniformity of vacancy concentration, so the atom fluxes do not diverge. In other words, concentration distribution is changed to eliminate the concentration gradient before occurrence of divergence of the atom fluxes. Studying two types of the causes in the occurrence of divergence of the atom fluxes, it can be said that the divergence of the atom fluxes may not occur in the reservoir portions.

SUMMARY OF THE INVENTION

It is an object of the invention to provide a wiring failure analysis method that analyzes wiring failures causing shape variations of wires by current and heat transfer analysis and analysis of diffusion of atoms in crystal grain structures and that is applicable to analysis of shapes of voids with respect to reservoir portions of aluminum alloy wiring coupled with tungsten plugs.

Basically this invention actualizes a wiring failure analysis method that performs simulation of wiring failure analysis using electromigration on the basis of the potential analysis and analysis of diffusion of atoms at grain boundaries of crystal grain structures. A first aspect of this invention is to perform a specific process on generation of voids based on magnitude of chemical potentials. A second aspect of this invention is to calculate chemical potentials before and after generation of virtual voids around nodes being obtained from mesh information of wiring. A third aspect of this invention corresponds to details of calculation of the chemical potentials, in which gradients are calculated with respect to the chemical potentials being produced by surface energy. A fourth aspect of this invention is to realize growth of voids in areas in which variations of chemical potentials due to generation of voids in unit volume are smallest when vacancy concentration exceeds the critical value. A fifth aspect of this invention is application of the wiring failure analysis specifically to LSI circuits having reservoir portions that are formed at end portions of wires. A sixth aspect of this invention is application of the wiring failure analysis specifically to LSI circuits in which wires are made of aluminum alloy while plugs are made of tungsten.

Figure 9:
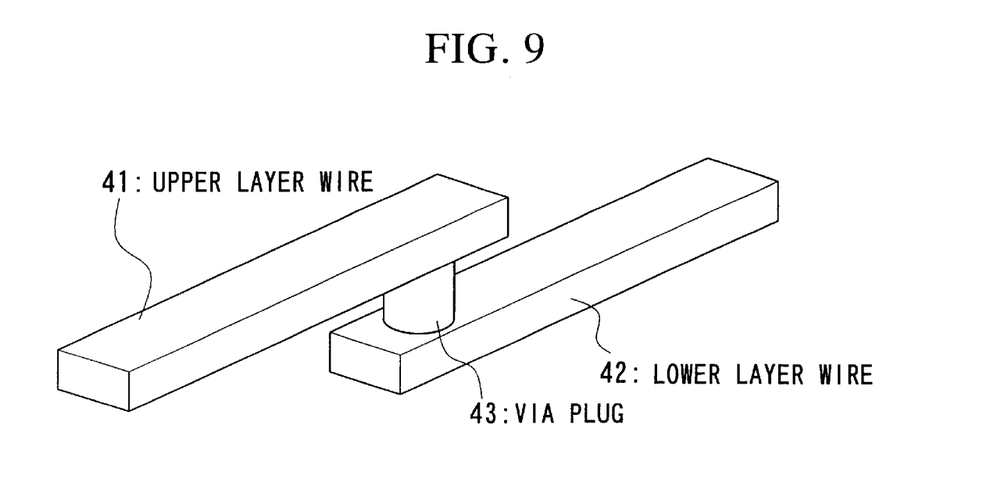
FIG. 9 is a perspective view showing a via structure of wires.
Figure 10:
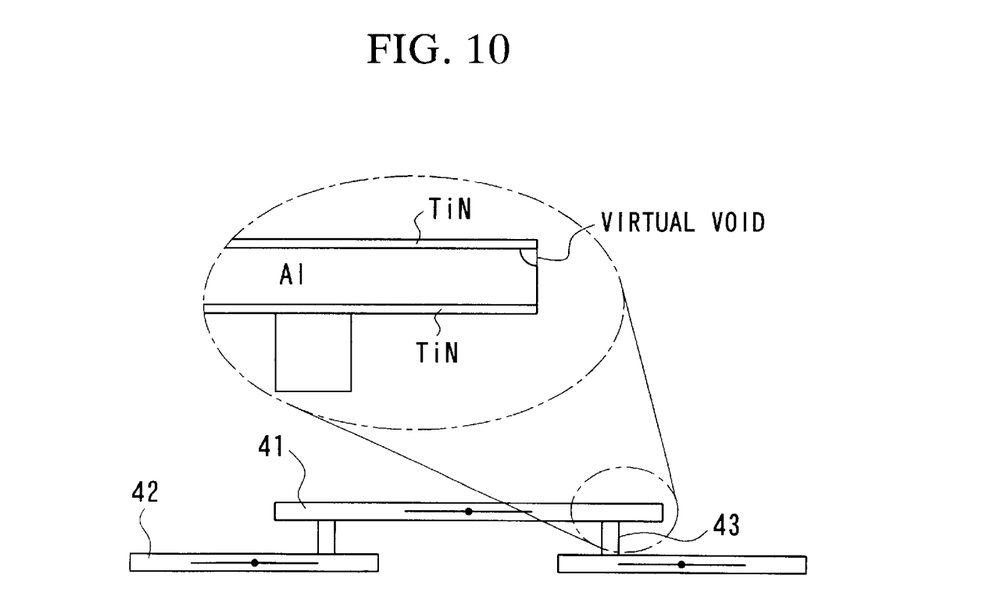
FIG. 10 is a side view partly in section showing the via structure of wires being magnified.

FIGS. 9 and 10 show an example of a via structure of wires that is configured by an upper layer wire 41, a lower layer wire 42 and a via plug 43. That is, the via structure of wires is created as shown in FIGS. 9 and 10, and then the finite element method is applied to solve the background field (e.g., temperature, current density) to provide electron wind power proportional to the current density and diffusion coefficients with respect to parameters of crystal structures such as the crystal lattice, grain boundary, interface and surface. Thus, vacancy concentration is calculated by performing diffusion analysis using the electron wind power and diffusion coefficients. If the hole concentration exceeds the critical value with respect to the grain boundary and interface, micro voids are virtually generated around nodes respectively, so chemical potentials are calculated before and after generation of the micro voids. Then, voids are actually generated around the node at which variations of chemical potentials being calculated is smallest.

Figure 6:
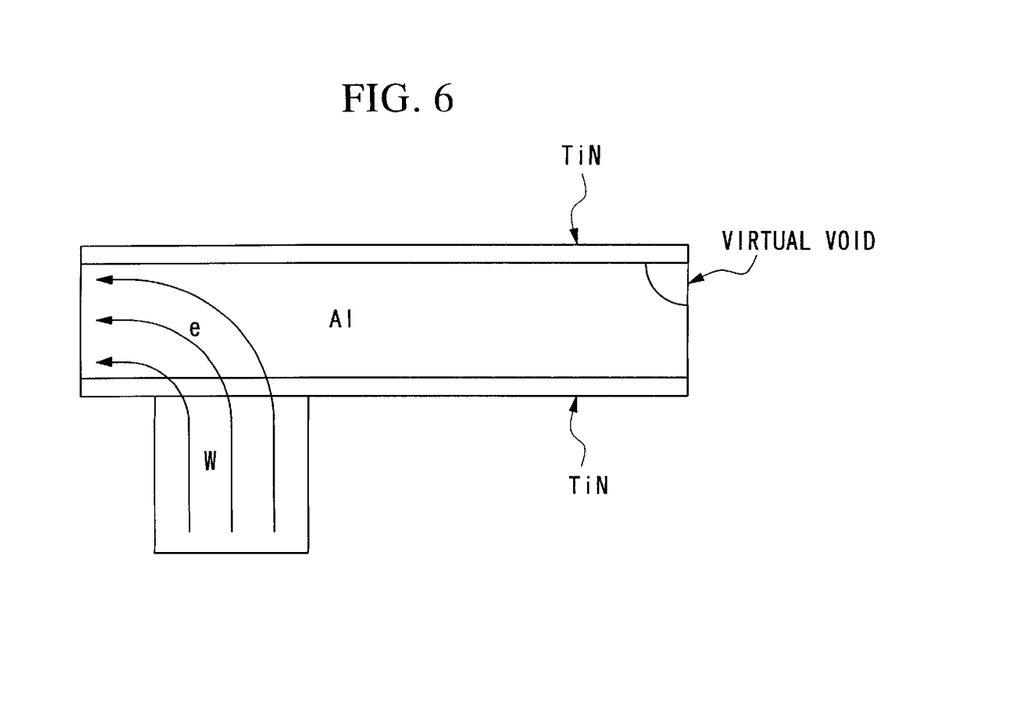
FIG. 6 diagrammatically shows a sectional shape of a wire in its longitudinal direction, which shows the calculation result of the void shape deformation process shown in FIG. 5.

Incidentally, the reservoir portion corresponds to a right side of a wire shown in FIG. 6, and it also corresponds to a right side viewed from the via plug 43 in the wire shown in FIGS. 9 and 10. That is, the reservoir portion acts as a sink for the supply of atoms, which is provided to avoid disconnection of the wire due to a leftward flow of atoms along with a flow of electrons. In addition, the electromigration is the phenomenon in which atoms are moved due to flow of electric currents.

The atom drift is driven by the electron wind power and Coulomb's force, while diffusion is driven by the concentration gradient and pressure gradient. Because atoms can be regarded as charged particles that are slightly ionized, they are influenced by force due to the potential gradient (i.e., electric field) and are also influenced by force of electrons called "electron wind power". Herein, the electron wind power is caused by momentum due to the high-density flow of electric currents, which is above 1 $MA/cm^2$ in wires of the LSI circuits, for example. That is, electrons are scattered by atoms or ions to produce electric resistance, by which the atoms or ions react to receive the momentum.

In summary, this invention provides a wiring failure analysis method that overcomes difficulties due to shape changes of wires in LSI circuits and the like by effecting current and heat transfer analysis as well as analysis of diffusion of atoms in crystal grain structures. Particularly, the wiring failure analysis method is designed to apply void shape analysis on reservoir portions of aluminum alloy wires coupled with tungsten (W) plugs. First, a structure of a wire to be simulated is created to solve its background field (temperature and current densities) in accordance with the finite element method. Then, diffusion analysis is performed using electron wind power, which is proportional to the current densities, and diffusion coefficients regarding parameters of the crystal grain structure such as the crystal lattice, grain boundary, interface and surface, on which vacancy concentrations are calculated. As for the grain boundary and interface, virtual voids are generated in proximity to prescribed nodes at which the vacancy concentrations exceed the critical value. Differences of chemical potentials are calculated before and after generation of the virtual voids with respect to the prescribed nodes respectively. Then, one of the prescribed nodes is detected as a node that causes smallest variation of the chemical potentials due to generation of the virtual void. Thus, a void is generated in proximity to the detected node, which is then subjected to void shape deformation process using electromigration.

BRIEF DESCRIPTION OF THE DRAWINGS

These and other objects, aspects and embodiment of the present invention will be described in more detail with reference to the following drawing figures, of which.

DESCRIPTION OF THE PREFERRED EMBODIMENT

This invention will be described in further detail by way of examples with reference to the accompanying drawings.

Figure 1:
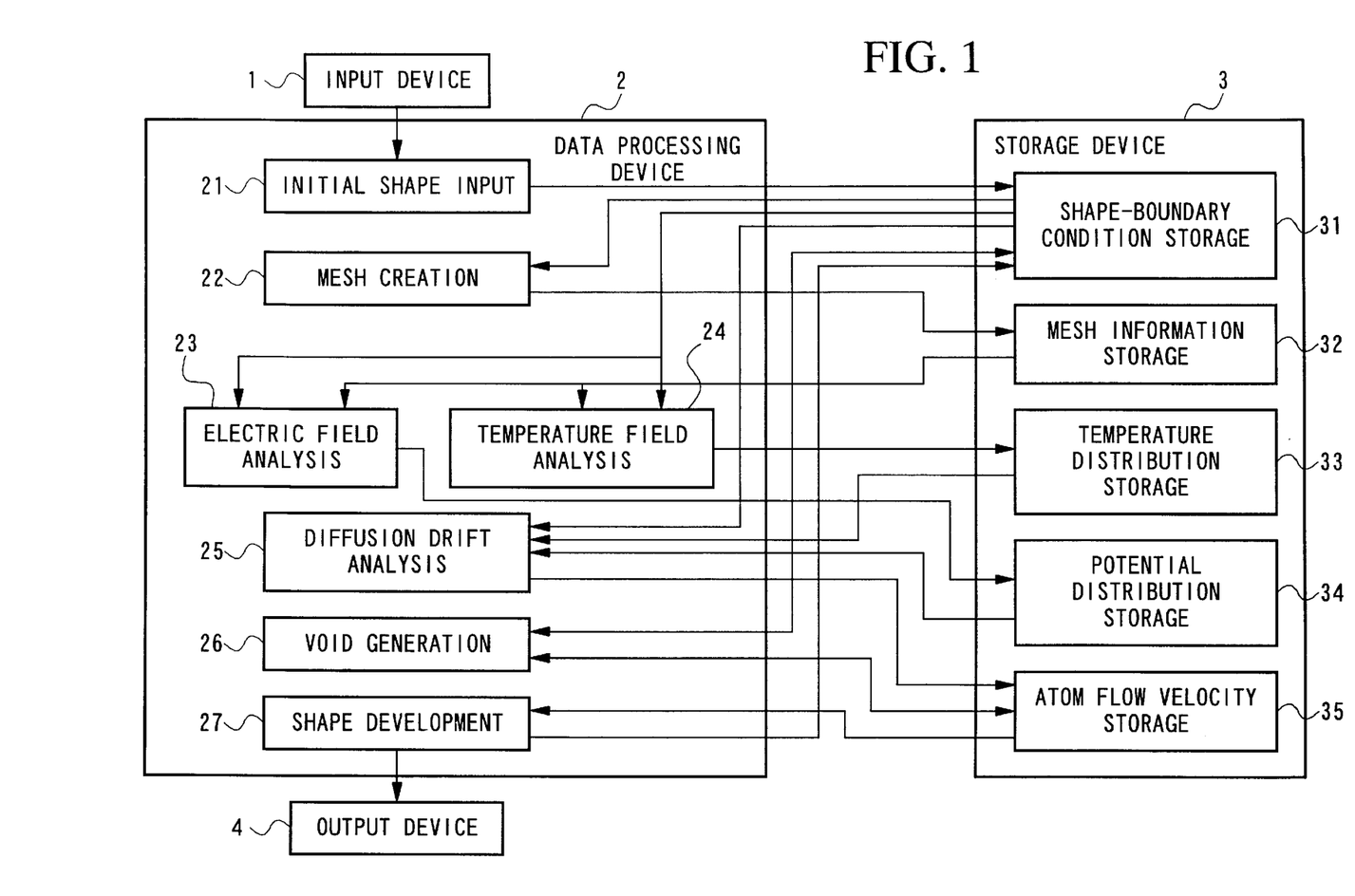
FIG. 1 is a block diagram showing a configuration of an apparatus for use in wiring failure analysis in accordance with the invention.

FIG. 1 shows an electric configuration of an apparatus for use in wiring failure analysis in accordance with the present invention. In FIG. 1, reference numeral 1 designates an input device such as a keyboard, 2 designates a data processing device that operates based on data and programs input by the input device 1, 3 designates a storage device that stores data to be processed by the data processing device 2, and 4 designates an output device that outputs data processed by the data processing device 3 by means of a display, a printer or the like.

The data processing device 2 contains an initial shape input block 21, a mesh creation block 22, an electric field analysis block 23, a temperature field analysis block 24, a diffusion drift analysis block 25, a void generation block 26 and a shape development block 27.

The storage device 3 contains a shape-boundary condition storage block, a mesh information storage block 32, a temperature distribution storage block 33, a potential distribution storage block 34 and a atom flow velocity storage block 35.

Figure 2:
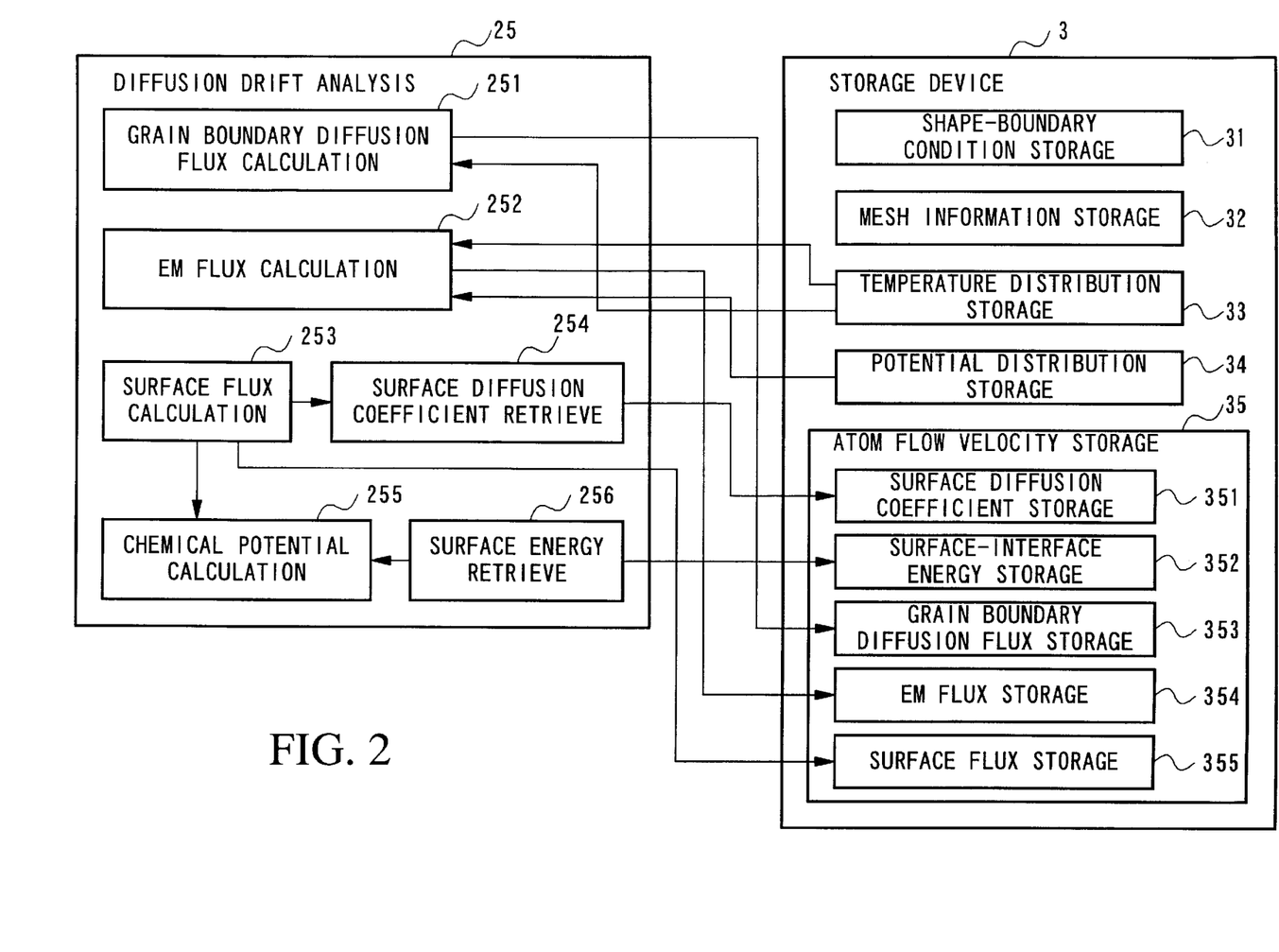
FIG. 2 is a block diagram showing details of a diffusion drift analysis block and its related parts of an atom flow velocity storage block in a storage device shown in FIG. 1.

FIG. 2 shows details of the diffusion drift analysis block 25 and details of the atom flow velocity storage block 34 within the storage device 3. That is, the diffusion drift analysis block 25 contains a grain boundary diffusion flux calculation block 251, an electromigration flux (or EM flux) calculation block 252, a surface flux calculation block 253, a surface diffusion coefficient retrieve block 254, a chemical potential calculation block 255 and a surface energy retrieve block 256. In addition, the atom flow velocity storage block 35 contains a surface diffusion coefficient storage block 351, a surface-interface energy storage block 352, a grain boundary diffusion flux storage block 353, an electromigration flux storage block 354 and a surface flux storage block 355.

Using the input device 1, the initial shape input block 21 inputs values of physical properties corresponding to shapes and materials of wires and peripheries such as insulation films as well as boundary conditions that are necessary for execution of the wiring failure simulation. Input data representing the aforementioned values and conditions are stored in the shape-boundary condition storage 31.

The mesh creation block 22 reads from the shape-boundary condition storage block 31, shape data with respect to the wires and insulation films respectively. Based on the shape data, it creates a mesh, information of which is stored in the mesh information storage block 32.

With reference to the mesh information of the wires stored in the mesh information storage block 32 and the boundary conditions stored in the shape-boundary condition storage block 31, the electric field analysis block 23 solves the Poisson equation by using the finite element method or finite volume method. Thus, it produces potentials of nodes of the mesh, which are stored in the potential distribution storage block 34.

Figure 12:
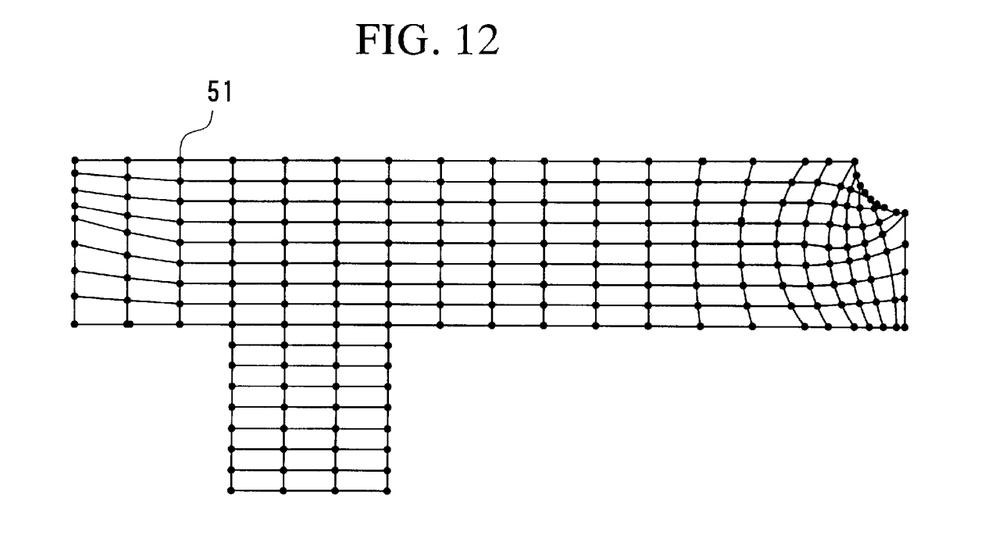
FIG. 12 diagrammatically shows a mesh including nodes and elements.

After creation of the mesh, all of the nodes are arranged as shown in FIG. 12. That is, FIG. 12 illustrates an image of a mesh that is created based on the shape of the wire shown in FIG. 6 and that contains elements and nodes. Herein, an entire area is subdivided into small areas (called "elements"), which are subjected to discretization, wherein the nodes designate vertices of figures constructing the elements respectively. For example, a rectangular figure corresponding to a single element is expressed using four points, and a triangular figure corresponding to a single element is expressed using three points. The present embodiment deals with each of the crystal grains independently, so each of them is subjected to subdivision. This expands and arranges the nodes along grain boundaries and surfaces.

With reference to the mesh information regarding the wires and insulation films stored in the mesh information storage block 32 and the boundary conditions regarding thermal analysis stored in the shape-boundary condition storage block 31, the temperature field analysis block 24 solves the thermal equation by using the prescribed analysis methods such as the finite element method and finite volume method. Thus, it calculates temperatures of the nodes, which are stored in the temperature distribution storage block 33. The present embodiment handles the temperatures of the nodes similarly to the aforementioned potentials of the nodes.

The diffusion drift analysis block 25 refers to the mesh information stored in the mesh information storage block 32 with respect to grain boundaries, interfaces and void surfaces respectively. That is, it calculates drive forces due to diffusion coefficients, vacancy concentration and surface energy with respect to nodes of the grain boundaries, interfaces and void surfaces. Then, it calculates fluxes due to the drive forces, which are then stored in the atom flow velocity storage block 35.

In the above, the drive force due to the surface energy (in other words, drive force due to the surface energy gradient) is defined as drive force due to the chemical potential gradient. The drive force is a source for producing a flow of matters. That is, the drive force is generally used for describing phenomenology of movement of matters due to variations of the surface energy from high energy state (or shape) to low energy state (or shape). Details are described by the monograph entitled "Atomic and computer modeling of metallization failure of integrated circuits by electromigration", which is written by R. Kirchheim and U. Kaeber for Journal of Applied Physics, Vol. 70, pp. 172–181 in 1991.

According to the aforementioned monograph, aluminum atom flux is expressed by one dimensional notation, as follows:

$$J = -D\frac{\partial c}{\partial x} + \frac{Dc}{kT}Z*eE + \frac{Dc}{kT^2}Q*\frac{\partial T}{\partial x} \qquad (1)$$

In the above, J denotes the aluminum atom flux (that is, the number of aluminum atoms that moves in the unit volume per unit time), D denotes a diffusion coefficient of the aluminum atoms, c denotes concentration of the aluminum atoms, k denotes Boltzmann's constant, T denotes absolute temperature, Z* denotes effective valence, e denotes unit charge, E denotes electric field strength, and Q* denotes heat of transport. The present embodiment disregards the third term of the equation (1) because it is significant only in the case of a large temperature gradient. Expanding the dimension, it is possible to rewrite the equation (1) as follows:

$$J = -Dgradc - \frac{Dc}{kT}eZ*grad\Psi \qquad (2)$$

In the above, $\Psi$ denotes electric potential. The first term in the right side of the equation (2) is related to concentration gradient, while the second term is related to the electric field. Therefore, the equation (2) refers to EM flux (or electromigration flux). Incidentally, the grain boundary flux is described directly using the concentration gradient as it is. In addition, the surface diffusion flux is described using the concept of the chemical potential, which uses curvature in addition to the surface energy. The EM flux does exit on the surface as similarly to the grain boundary. Based on the condition of continuity (where no terms for production and annihilation are included), it is possible to calculate variations of concentration from the flux by the following equation.

$$\frac{\partial c}{\partial t} + divJ = 0 \qquad (3)$$

With reference to stored contents of the shape-boundary condition storage block 31 and atom flow velocity storage block 35, the void generation block 26 selects nodes at which vacancy concentration exceeds the critical value. That is, the void generation block 26 proposes those nodes as candidates for generation of voids. Within those nodes, the void generation block 26 selects a node that causes smallest energy variations per unit volume due to generation of voids. So, it generates voids for the selected node, which is registered with the shape-boundary condition storage block 31.

With reference to stored content of the atom flow velocity storage block 35, the shape development block 27 calculates balances of fluxes with respect to surface elements respectively. Then, it calculates movement values of the surface elements to construct the entire surface. In addition, it changes positions of the nodes, which are stored in the shape-boundary condition storage block 31. Further, it outputs the shape of the void to the output device 4.

Figure 11:
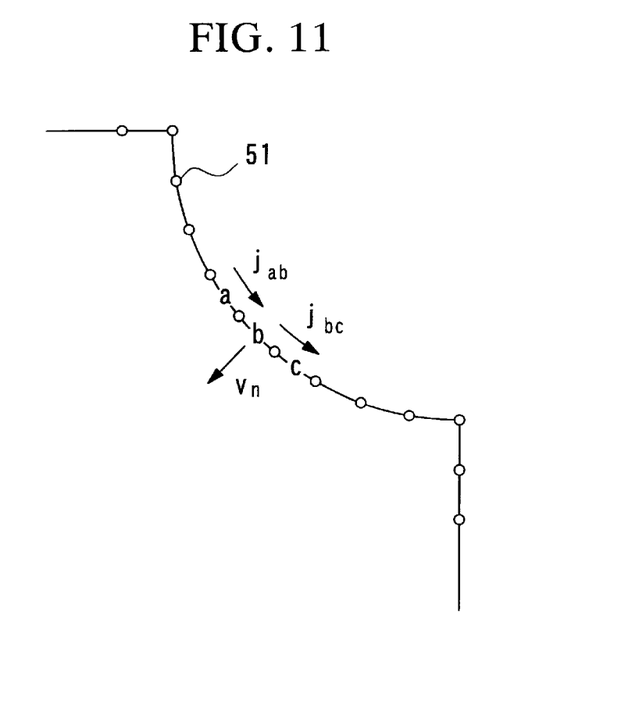
FIG. 11 shows shape variations of a void surface.

FIG. 11 diagrammatically shows a part of the void surface shown in FIG. 6, which is subjected to deformation. Herein, circular symbols 'O' connected together by chains designate surface elements 51 created on the void surface, from which three surface elements a, b, c are extracted for explanation of the deformation of the shape of the void surface. Among them, reference symbol jab designates a flux directing from a to b, and jbc designates a flux directing from b to c. Considering these fluxes, it is possible to calculate variations of the number of atoms 'dN' at the surface element b after the unit time by the following equation.

$$dN = dt(jab - jbc) \qquad (4)$$

Considering atom volume $\Omega$, velocity Vn of variations of the surface element b in the normal direction is given by the following equation.

$$Vn = \Omega \frac{dN}{dt\,ds} = \Omega \frac{jab - jbc}{ds} \qquad (5)$$

In the above, ds denotes a length of the surface element b. With respect to the surface element b, there are flow velocity jab of incoming atoms and flow velocity jbc of outgoing elements. If jab is greater than jbc, the surface element b runs short of atoms. This means regression of the void surface, wherein the surface element b regresses in the internal direction along the normal direction by Vn·dt.

Retrieving temperature data from the temperature distribution storage block 33 with respect to the nodes on the grain boundary, the grain boundary diffusion flux calculation block 251 shown in FIG. 2 calculates grain boundary diffusion coefficients. In addition, the grain boundary diffusion flux calculation block 251 calculates concentration gradients based on the grain boundary diffusion coefficients and the atom concentrations at adjacent nodes on the grain boundary. Based on the concentration gradients, it calculates grain boundary diffusion fluxes, which are stored in the grain boundary diffusion flux storage block 353. The grain boundary diffusion flux is given by the following equation.

$$J_{gb}^{d} = -D_{gb} \, grad \, c_{gb} \qquad (6)$$

In the above, reference symbol cgb denotes aluminum atom concentration at the grain boundary, Dgb denotes a diffusion coefficient of aluminum atoms at the grain boundary. In other words, the grain boundary diffusion coefficient Dgb is expressed as a function of temperature, which is given by the following equation.

$$D_{gb} = D_{o,gb} \exp\left(\frac{-E_{a,gb}}{kT}\right) \qquad (7)$$

In the above, reference symbol Do,gb denotes a constant part of the grain boundary diffusion coefficient, and Ea,gb denotes activation energy in grain boundary diffusion. In addition, a mathematical expression of 'grad Cgb' designates a concentration gradient, which is calculated based on the difference of concentrations at nodes of the grain boundary and the distance between grain boundaries.

Retrieving temperature data from the temperature distribution storage block 33 with respect to nodes on the grain boundary, the EM flux calculation block 252 calculates grain boundary diffusion coefficients. With reference to potential data stored in the potential distribution storage block 34, it also calculates current densities.

In addition, the EM flux calculation block 252 calculates EM fluxes based on the grain boundary diffusion coefficients as well as gradients of temperatures and potentials. The calculated EM fluxes are stored in the EM flux storage block 354. The EM flux in the grain boundary is given by the following equation.

$$I_{gb}^{EM} = -\frac{D_{gb}c}{k'T'} eZ * grad\Psi \qquad (8)$$

In the above, the potential gradient $\Psi$ is calculated in a discrete manner from potentials of adjacent nodes.

The surface flux calculation block 253 extracts a gradient of chemical potentials along the surface from the chemical potential calculation block 255 and a surface diffusion coefficient from the surface diffusion coefficient retrieve block 254. Based on the gradient and surface diffusion coefficient, the surface flux calculation block 253 calculates surface flux, which is stored in the surface flux storage block 355.

The chemical potential calculation block 255 extracts surface energy from the surface energy retrieve block 256, thus producing chemical potentials. Then, the chemical potential calculation block 255 calculates a gradient of the chemical potentials along the surface, which is transferred to the surface flux calculation block 253.

Details of the surface flux are disclosed by the monograph entitled "Electromigration failure by shape change of voids in bamboo lines", which is written by E. Arzt et al. for the Journal of Applied Physics in 1994, Vol. 76(3), pp. 1563–1571. According to the above monograph, the surface flux is defined as a sum of the surface energy component and EM flux component, which is expressed by the following equation.

$$J_s = J_s^k + J_s^e \qquad (9)$$

In the above, the surface energy component is given by the following equation.

$$J_s^k = -\frac{D_s}{\Omega kT} \frac{\partial \kappa}{\partial s} \qquad (10)$$

In the equation (10), reference symbol Ds denotes a surface diffusion coefficient, k denotes curvature, and s denotes coordinates along the surface. In addition, the EM flux component is given by the following equation.

$$J_s^e = \frac{D_s}{\Omega kT} eZ * grad\Psi \qquad (11)$$

Figure 3:
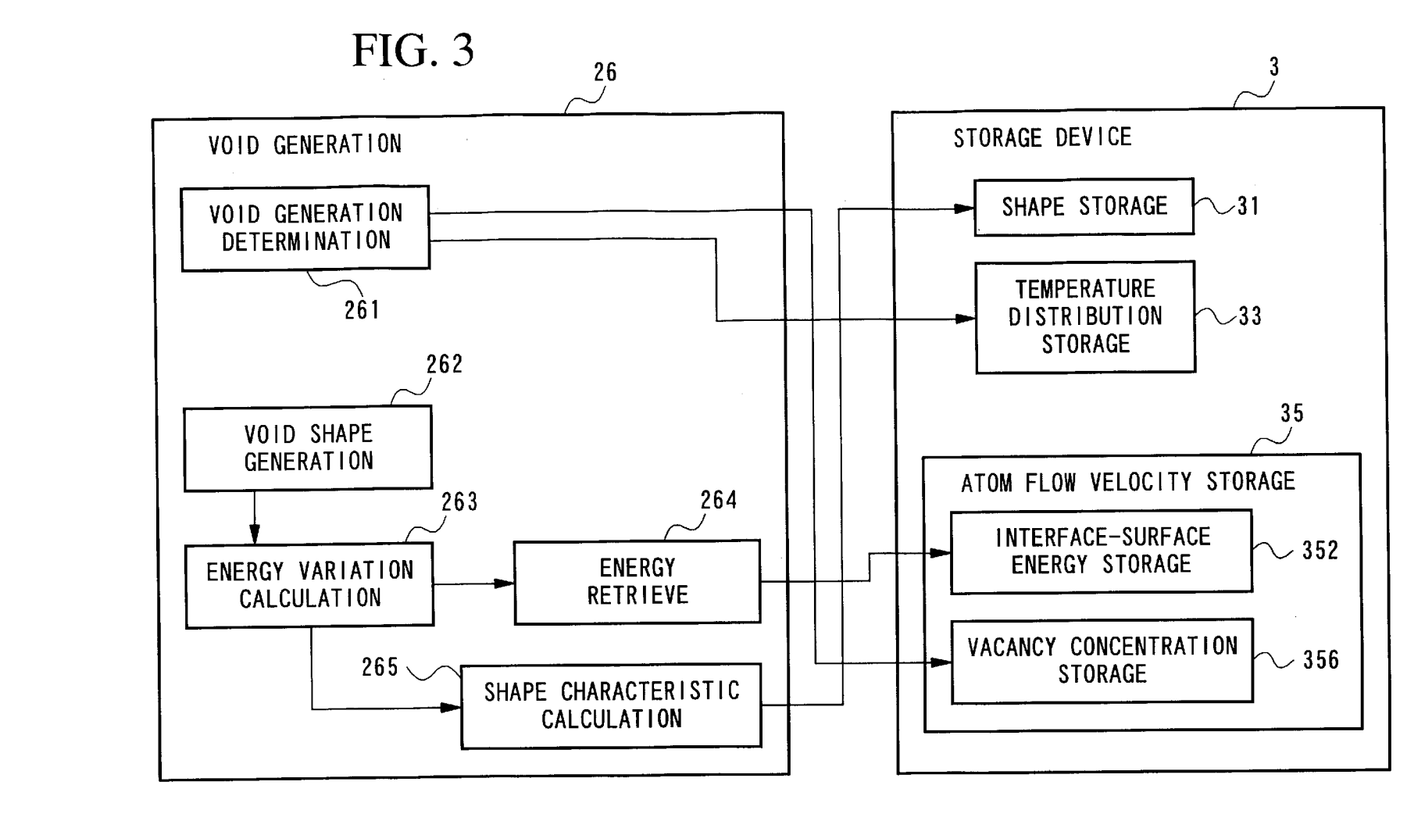
FIG. 3 is a block diagram showing details of a void generation block and its related parts of the atom flow velocity storage block in the storage device shown in FIG. 1.

FIG. 3 shows details of the void generation block 26 and atom flow velocity storage block 35 in the storage device 3 shown in FIG. 1. The void generation block 26 contains a void generation determination block 261, a void shape generation block 262, an energy variation calculation block 263, an energy retrieve block 264 and a shape characteristic calculation block 265. The atom flow velocity storage block 35 contains an interface-surface energy storage block 352 and a vacancy concentration storage block 356.

With reference to the vacancy concentration storage block 356, the void generation determination block 261 compared the present vacancy concentration with the critical value for use in determination of void generation with respect to each of the nodes. Then, the void generation determination block 261 proposes the node, at which the vacancy concentration exceeds the critical value, as a candidate of a point of void generation, which is marked and stored in the shape storage block 31.

With reference to the shape storage block 31, the void shape generation block 262 virtually generates a micro void around each of the nodes that are marked as the candidates of the points of void generation. Then, it determines a node corresponding to the smallest energy variation within energy variations that are calculated by the energy variation calculation block 263. So, a void is generated around the aforementioned node.

With reference to the interface-surface energy storage block 352, the energy retrieve block 264 retrieves the surface energy of the void and the interface energy before virtual generation of the void. With reference to the shape storage block 31, the shape characteristic calculation block 265 calculates volume of the void being virtually generated and the surface area of the void.

The energy variation calculation block 263 accesses the interface-surface energy storage block 352 via the energy retrieve block 264, and it also accesses the shape storage block 31 via the shape characteristic calculation block 265. With reference to those storage blocks, the energy variation calculation block 263 obtains the interface energy and surface energy as well as the shape characteristics (i.e., volume and surface area) of the void, by which it calculates energy variation per unit volume before and after generation of the void.

Next, operations of the present embodiment will be described with reference to FIGS. 4 and 5.

Figure 4:
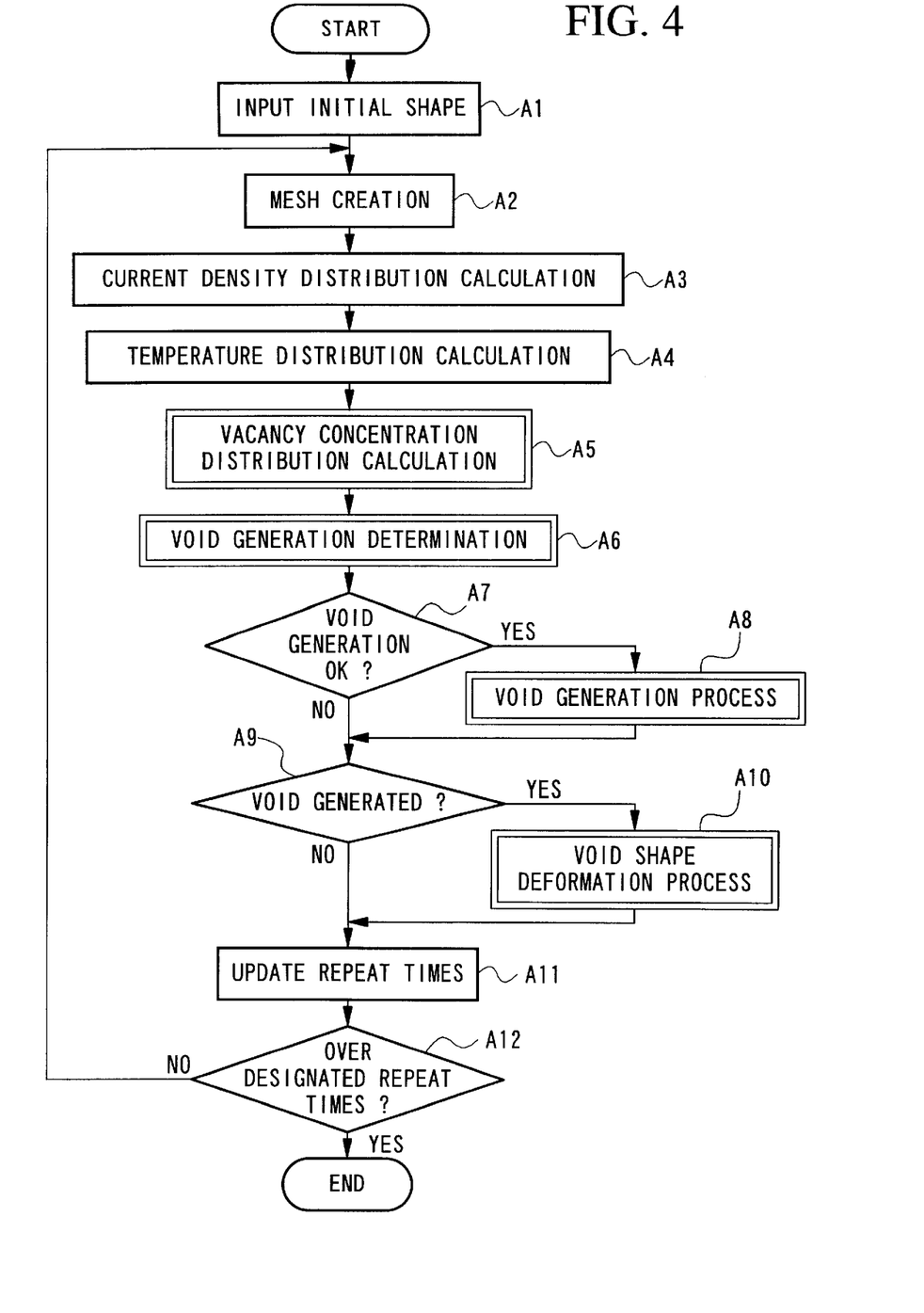
FIG. 4 is a flowchart showing a wiring failure simulation method in accordance with the invention.
Figure 5:
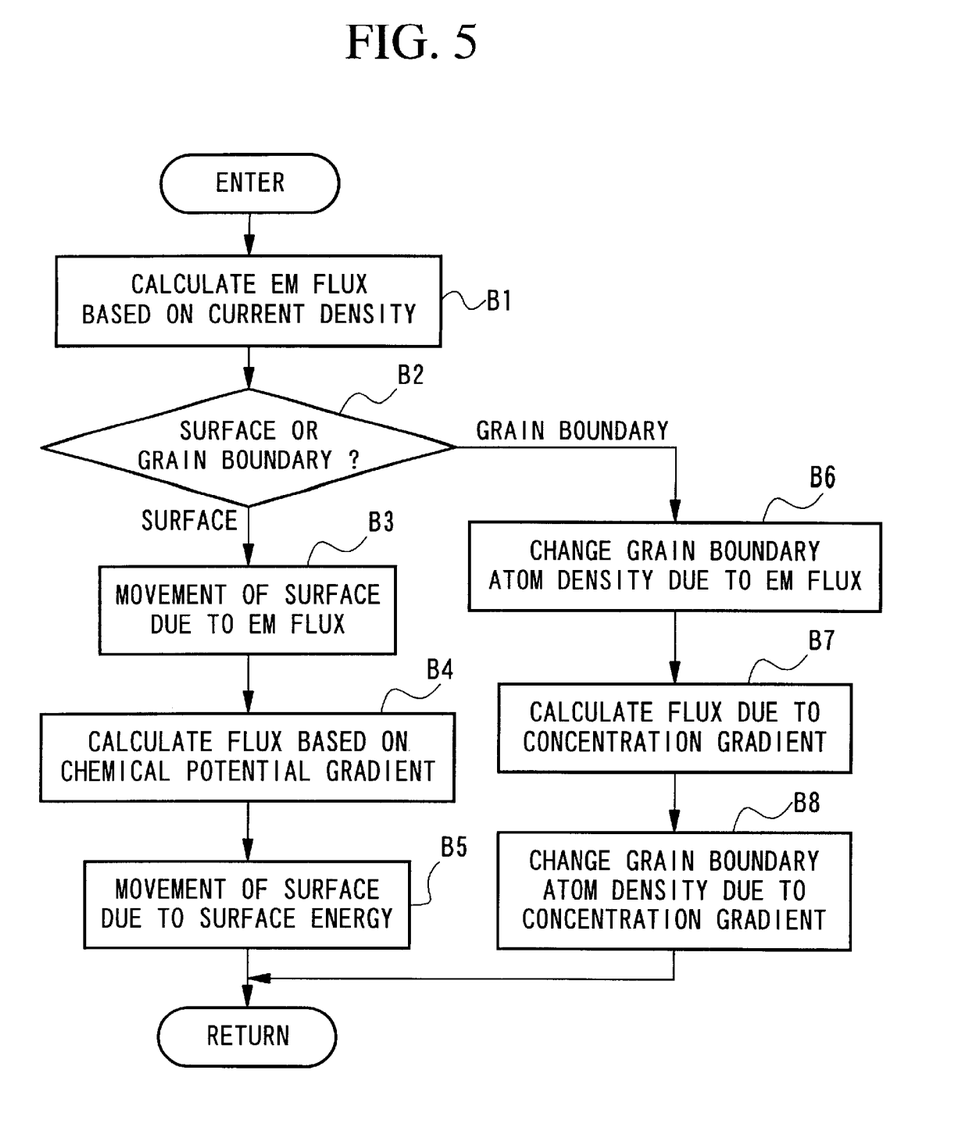
FIG. 5 is a flowchart showing a void shape deformation process of step A10 shown in FIG. 4.

FIG. 4 shows a flowchart for explaining a wiring failure simulation method using electromigration (EM), wherein grain boundaries and surface diffusion values of atoms on the crystal grain boundaries and void surfaces are to be produced based on current densities and temperature distribution, which are calculated by the finite element method or finite volume method.

The wiring failure simulation method will be described with reference to FIG. 4, which shows a flowchart consisting of twelve steps, namely A1 to A12.

(Step A1)
Using the input device 1, an initial structure is input in accordance with a wire shape and is processed by the initial shape input block 21 of the data processing device 2. Thus, the initial shape input block 21 produces physical properties corresponding to the wire shape and material as well as boundary conditions, which are stored in the shape-boundary condition storage block 21.

(Step A2)
With regard to the initial structure, the mesh creation block 22 creates a mesh, information of which is stored in the mesh information storage block 32.

(Step A3)
The electric field analysis block 23 solves the Poisson's equation by using the prescribed analysis method such as the finite element method and finite volume method. Thus, the electric field analysis block 23 calculates potentials of the nodes, distribution of which is stored in the potential distribution storage block 34.

(Step A4)
The temperature field analysis block 24 calculates distribution of temperatures due to the heat source of Joule heat that is generated by currents, which are obtained using the same mesh for use in calculation of the current density distribution. The temperature distribution is stored in the temperature distribution storage block 33.

(Step A5)
The diffusion drift analysis block 25 produces atom fluxes at the nodes respectively, so the fluxes and vacancy concentrations at the respective elements are stored in the atom flow velocity storage block 35.

(Step A6)
With reference to the vacancy concentration storage block 356, the void generation determination block 261 compares the vacancy concentration with the critical value for use in determination of void generation with respect to each of the nodes. Then, the void generation determination block 261 proposes the node, at which the vacancy concentration exceeds the critical value, as a candidate of a point of void generation, which is marked and stored in the shape storage block 31.

(Step A7)
If the void generation determination block 261 proposes at least one node as a candidate of a point of void generation, the flow proceeds to step A8 regarding a void generation process. If not, the flow directly proceeds to step A9 by skipping step A8.

(Step A8)
With respect to each of the 'marked' nodes, the void shape generation block 262 virtually generates a void to calculate energy variation before and after generation of the void. So, it generates a micro void for the node whose energy variation is the smallest.

(Step A9)
If the void is generated, the flow proceeds to step A10. If not, the flow directly proceeds to step A11 by skipping step A10.

(Step A10)
The shape development block 27 makes changes on atom densities in the grain boundaries, and it also makes movements on surface elements in consideration of incoming and outgoing atom fluxes on the surface. Thus, the shape development block 27 develops the shape of the void to be deformed.

(Step A11)
A number of times for repeating the aforementioned steps is to be updated.

(Step A12)
A decision is made as to whether the present number of times in repeating the steps reaches the designated number of times in repeating the steps or not. If the present number of times reaches the designated number of times, the flow ends execution of the steps. If not, the flow returns to step A2 regarding mesh creation again.

Next, details of the void shape deformation process of step A10 shown in FIG. 4 will be described with reference to FIG. 5, which shows a flowchart consisting of eight steps, namely B1 to B8.

(Step B1)
The EM flux calculation block 252 calculates potential gradients based on potentials measured at ends of all surface elements or grain boundary elements. In response to effective charge Z*, electric charge e of an electron, electric field (or potential gradient) E and a diffusion coefficient corresponding to contact temperature, it calculates EM flux 'J' on the surface or grain boundary by the following equation.

$$J = \frac{D(T)}{kTZ^*} \cdot eE$$

(Step B2)
Discrimination is made between the surface and grain boundary. As for the surface, the flow proceeds to step B3. As for the grain boundary, the flow proceeds to step B6.

(Step B3)
In the case of the surface, the surface diffusion coefficient retrieve block 254 obtains a surface diffusion coefficient based on the EM flux. Then, the surface element is moved in response to an increase or decrease of the number of atoms due to the EM flux.

(Step B4)

The chemical potential calculation block 255 calculates a gradient of chemical potentials along the void surface, which is stored in the surface flux storage block 355 by the surface flux calculation block 253.

(Step B5)

With reference to the surface fluxes on the surface, movement values of matters in the normal direction of the surface are determined in proportion to differences between incoming fluxes and outgoing fluxes with respect to surface elements. Thus, the surface are moved in response to the movement values. Then, processing regarding the surfaces is ended.

(Step B6)

In the case of the grain boundary, atom concentration for the prescribed grain boundary element is changed in response to the EM flux, which is calculated in the foregoing step B1.

(Step B7)

The grain boundary diffusion flux calculation block 251 calculates flux due to the concentration gradient caused by the aforementioned step B6, so the calculated flux is stored in the grain boundary diffusion flux storage block 353.

(Step B8)

Concentration is calculated for the grain boundary based on its grain boundary diffusion flux. Thereafter, the void shape deformation process is ended.

FIG. 6 shows result of the void shape deformation process or calculation.

That is, FIG. 6 shows a sectional shape of a wire in its longitudinal direction, wherein the wire is extended in a leftward direction, illustration of which is omitted. Electrons (e) flow in directions from the bottom of the tungsten plug (W) to the left side of the wire. Electric currents flow in directions inverse to the aforementioned directions regarding movements of electrons. That is, the electric currents flow from the left side of the wire to the bottom of the tungsten plug. A right side of the tungsten plug is called a reservoir, at which current density is low.

More specifically, the aluminum alloy wire is sandwiched between TiN films. This inhibits boundary condition atom vacancies from flowing into the left end portion of the wire. This is because of an assumption that the wire acts as bamboo grains in which vacancies are barely flowed. If electric currents are forced to flow in the wire under the aforementioned condition, the vacancy concentration distribution changes such that the vacancy concentration is gradually increased in proximity to the tungsten plug, which causes reverse drive force due to the concentration gradient so that the flux balances with the reverse flux, and then the vacancy concentration becomes substantially uniform and high in the reservoir portion.

Adequately determining the critical concentration, the vacancy concentration exceeds the critical concentration at the reservoir portion containing the upper portion just above the tungsten plug. Hence, the energy variation, which is caused due to virtual generation of the void at the node (particularly, note on the interface) that is marked by the aforementioned determination of void generation, occurs above the end portion of the wire. Thus, it is possible to cause shape changes of the void due to generation of the void at the reservoir portion.

As described heretofore, the present invention has a variety of effects and technical features, which will be described below.

(1) A first aspect of this invention is to provide a wiring failure analysis method that performs wiring failure analysis simulation using electromigration by effecting the potential analysis and analysis of diffusion of atoms at grain boundaries of crystal grain structures. Herein, the wiring failure analysis is made by effecting the prescribed processing based on magnitudes of chemical potentials with respect to generation of voids. Thus, it is possible to regenerate the voids at areas of low current densities such as the reservoir portions of the tungsten plugs. This brings a guiding principle in design of reservoir lengths.

(2) A second aspect of this invention is to specify the calculation method for calculating chemical potentials before and after generation of virtual voids around the nodes, which are set by mesh information of the wire. This brings simplicity in wiring failure analysis.

(3) A third aspect of this invention is to specify the calculation method for calculating gradients of chemical potentials, which are produced based on surface energy. This brings simplicity in wiring failure analysis.

(4) A fourth aspect of this invention is to specify the location for growing the void in the area that produces the smallest chemical potential variation due to generation of the void of unit volume when the vacancy concentration exceeds the critical value. This brings further simplicity in wiring failure analysis.

(5) A fifth aspect of this invention is application of the wiring failure analysis specifically to the LSI circuits that have reservoir portions at end portions of wires.

(6) A sixth aspect of this invention is application of the wiring failure analysis specifically to the LSI chips in which wires are made of aluminum alloy, and plugs are made of tungsten (W).

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A wiring failure analysis method comprising the steps of:

performing simulation of wiring failure analysis using electromigration by effecting potential analysis and analysis of diffusion of atoms at grain boundaries of crystal grain structures; and generating voids in proximity to nodes of a mesh covering a wire coupled with a plug in response to chemical potentials, wherein the chemical potentials are calculated before and after generation of virtual voids in proximity to the nodes being produced from mesh information representing the mesh covering the wire.

2. A wiring failure analysis method according to claim 1 wherein gradients are produced from the chemical potentials that are calculated based on surface energy of the voids.

3. A wiring failure analysis method according to claim 1 wherein gradients are produced from the chemical potentials that are calculated based on surface energy of the voids.

4. A wiring failure analysis method according to any one of claims 1, 2 and 3 wherein the simulation of the wiring failure analysis is performed on an LSI circuit that provides a reservoir portion in an end portion of a wire.

5. A wiring failure analysis method according to any one of claims 1, 2 and 3 wherein the simulation of the wiring failure analysis is performed on an LSI circuit in which the wire is made of aluminum alloy, and the plug is made of tungsten.

6. A wiring failure analysis method, comprising the steps of:

performing simulation of wiring failure analysis using electromigration by effecting potential analysis and analysis of diffusion of atoms at grain boundaries of crystal grain structures; and generating voids in proximity to nodes of a mesh covering a wire coupled with a plug in response to chemical potentials, wherein the voids are forced to grow in areas that cause smallest variations of the chemical potentials due to generation of voids of unit volume when vacancy concentration exceeds a critical value.

7. A wiring failure analysis method according to claim 6, wherein the simulation of the wiring failure analysis is performed on an LSI circuit that provides a reservoir portion in an end portion of the wire.

8. A wiring failure analysis method according to claim 6, wherein the simulation of the wiring failure analysis is performed on an LSI circuit in which the wire is made of aluminum alloy, and the plug is made of tungsten.

9. A wiring failure analysis method according to claim 6, 7 and 8, wherein the chemical potentials are calculated before and after generation of virtual voids in proximity to the nodes being produced from mesh information representing the mesh covering the wire.

10. A wiring failure analysis method according to claim 6, 7 and 8, wherein gradients are produced from the chemical potentials that are calculated based on surface energy of the voids.

11. A wiring failure analysis method according to claim 6, 7 and 8, wherein the chemical potentials are calculated before and after generation of virtual voids in proximity to the nodes being produced from mesh information representing the mesh covering the wire, and wherein gradients are produced from the chemical potentials that are calculated based on surface energy of the voids.

12. A wiring failure analysis method that is applied to an LSI circuit in which a reservoir portion is provided at an end portion of an aluminum alloy wire coupled with a tungsten plug, comprising the steps of:

inputting an initial structure of a subject of wiring corresponding to the LSI circuit;

creating a mesh covering the initial structure of the subject of wiring;

calculating current density distribution based on potentials of nodes of the mesh in accordance with a finite element method or a finite volume method;

calculating temperature distribution based on heat sources of Joule heat caused by currents flowing the mesh;

calculating vacancy concentration distribution with respect to the nodes of the mesh;

marking prescribed nodes within the nodes by comparison between vacancy concentration and its critical value, so that each of prescribed nodes is marked as a point of void generation if the vacancy concentration exceeds the critical value;

detecting energy variations by virtually generating voids with respect to the prescribed nodes respectively, thus detecting a node that causes lowest energy;

generating a void in proximity to the detected node; and performing a void shape deformation using electromigration with respect to the void that is generated in proximity to the detected node.

13. A wiring failure analysis method according to claim 12 wherein the energy variations are produced by calculating differences of chemical potentials before and after generation of the virtual voids in proximity to the prescribed nodes respectively, so that one of the prescribed node is detected because of smallest variation of the chemical potentials.

* * * * *